Figure 1:
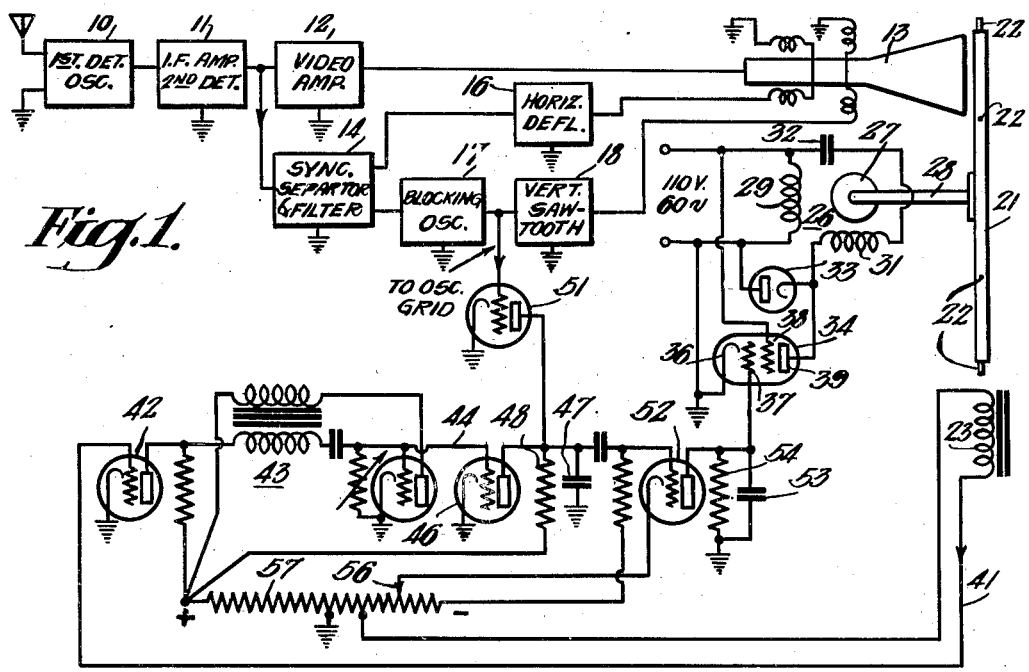

June 20, 1944.　　G. L. GRUNDMANN　　2,351,759
MOTOR SPEED CONTROL
Filed June 28, 1941　　2 Sheets-Sheet 1

Fig. 2a. SAW-TOOTH FROM WHEEL
Fig. 2b. SAW-TOOTH FROM VERT. OSC.
Fig. 2c. COMBINED VOLTAGES IN PHASE
Fig. 2d. COMBINED VOLTAGES OUT OF PHASE (90°)
Fig. 2e. COMBINED VOLTAGES WITH SLIGHTLY RETARDED PHASE
→ TIME

Inventor
Gustave L. Grundmann
By
Attorney

June 20, 1944.  G. L. GRUNDMANN  2,351,759
MOTOR SPEED CONTROL
Filed June 28, 1941  2 Sheets-Sheet 2
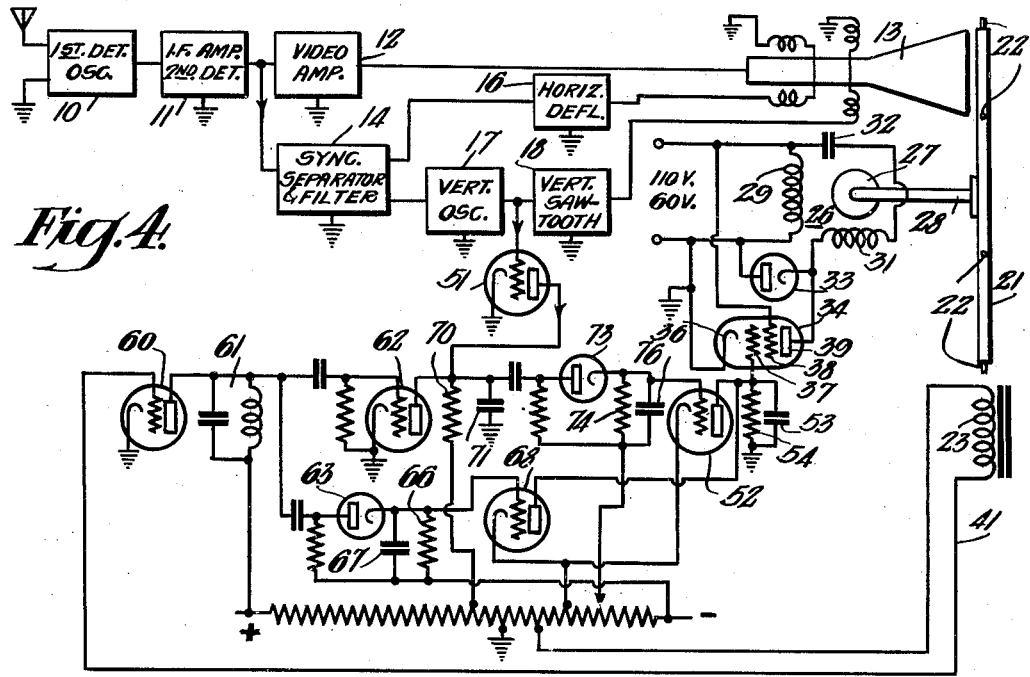
Fig. 4.
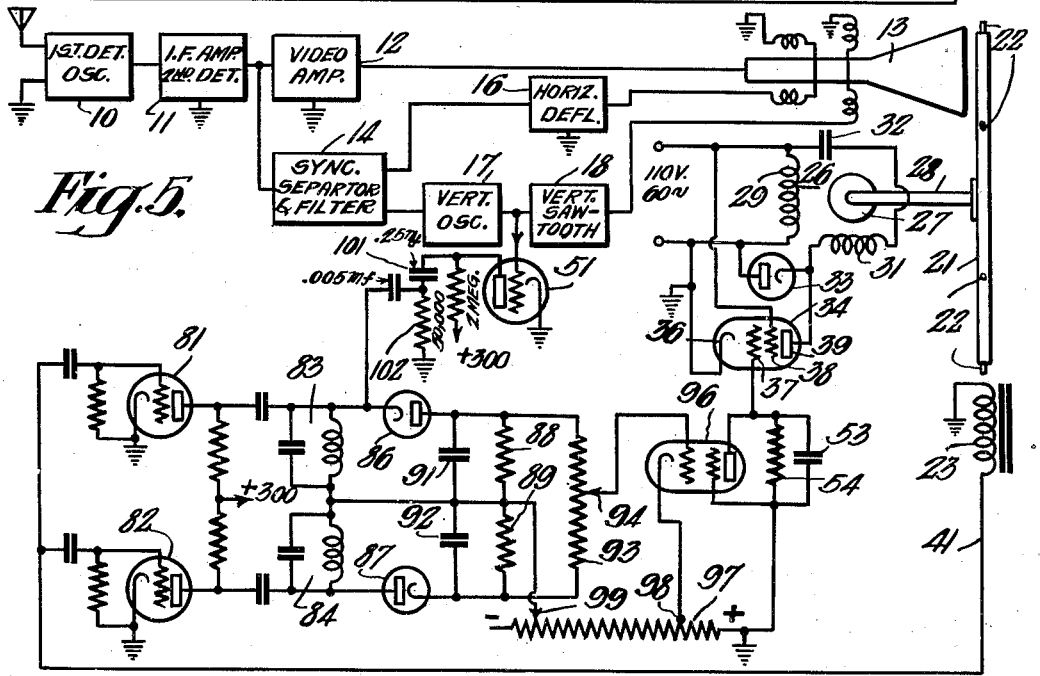
Fig. 5.
Fig. 6a.
Fig. 6b.
Inventor
Gustave L. Grundmann
By
Attorney Patented June 20, 1944

2,351,759

UNITED STATES PATENT OFFICE 2,351,759

MOTOR SPEED CONTROL

Gustave L. Grundmann, Westmont, N. J., assignor to Radio Corporation of America, a corporation of Delaware Application June 28, 1941, Serial No. 400,271

5 Claims. (Cl. 178—5.4)

My invention relates to motor speed control circuits or systems and particularly to such control circuits and associated apparatus as applied to television receivers for maintaining a color filter disc or wheel in synchronism with a similar color wheel at the transmitter.

In the past it has been common practice in television systems for transmitting color pictures to utilize at both transmitter and receiver color filters mounted on discs or wheels which are rotated in synchronism by means of synchronous motors operated from a common power line. In systems operated in this way the synchronous motors are rather large and expensive, this being true even when part of the power is supplied by a non-synchronous motor.

As to the use of a common power line, this is objectionable because it means that in some localities a color receiver cannot be operated. If the synchronizing power for the synchronous motors is obtained from a circuit controlled by pulses transmitted and amplified sufficiently to drive the motor, such a circuit is expensive because it must supply a fairly large amount of power to the synchronous motor.

An object of the present invention is to provide an improved method of and means for driving color wheels or the like in synchronsim in a television system.

A further object of the invention is to provide an improved speed control system for television or like apparatus.

A still further object of the invention is to provide an improved method of and means for controlling the speed of a non-synchronous motor.

A still further object of the invention is to provide an improved method of and means for controlling the speed of a split-phase motor of the capacitor type.

In one of the preferred embodiments of the invention the color wheel at the television receiver is driven by a split-phase capacitor type motor in which those ends of the two field windings that ordinarily are connected directly together are, instead, connected together through a rectifier such as a diode. As a result, the motor's capacitor will become fully charged and one field winding will have no current flowing through it thereafter unless a discharge circuit is provided for the capacitor. Since the speed of the motor depends upon the amount of current flowing through the said one winding, the motor speed may be controlled by means of a vacuum tube in a capacitor discharge circuit.

Further in accordance with one embodiment of the invention, the required synchronizing control voltage which is to be applied to the abovementioned vacuum tube is obtained by mixing pulses from a tone wheel or the like rotating with the color wheel together with pulses from the vertical deflecting circuit. The combined pulses are rectified and filtered to produce the desired control voltage which changes in value in response to any change in the phase relation of the two groups of pulses.

In a preferred embodiment of the invention there is provided, besides the above-described control circuit, a circuit which provides a comparatively rough speed control, this circuit being effective when the speed of the color wheel is too far from the synchronous speed for the synchronizing circuit itself to be effective.

Figure 3:
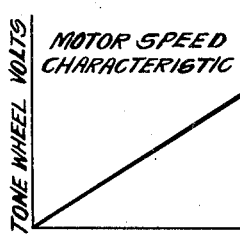

Other objects, features and advantages of the invention will be apparent from the following description taken in connection with the accompanying drawings in which Fig. 1 is a block and circuit diagram of a television receiver to which one embodiment of my invention is applied, Figs. 2a to 2e are curves which are referred to in explaining the operation of the receivers shown in Figs. 1 and 4, Fig. 3 is a curve showing the relation of the motor speed to the control voltage generated by the tone wheel in Fig. 1, Fig. 4 is a block and circuit diagram showing another embodiment of the invention applied to a television receiver, Fig. 5 is another block and circuit diagram of a television receiver showing a preferred embodiment of the invention, and Figs. 6a and 6b are curves which are referred to in explaining the operation of the circuit in Fig. 5.

Referring to Fig. 1, the television receiver is of a well-known type comprising a first detector and a tunable oscillator indicated at 10, an intermediate frequency amplifier and a second detector indicated at 11, a video amplifier 12 and a cathode ray tube 13. The receiver is designed for the reception of the usual composite signal comprising picture signals and horizontal and vertical synchronizing pulses, a horizontal synchronizing pulse following each scanning line and a vertical synchronizing pulse occurring at the end of each vertical deflection.

The said composite signal is supplied both to the cathode ray tube 13 and to a suitable synchronizing pulse separating and filtering circuit indicated at 14. From the circuit 14, horizontal synchronizing pulses are supplied to a horizontal deflecting circuit 16 and vertical synchronizing pulses are supplied to a vertical deflecting circuit comprising the usual blocking oscillator 17 and saw-tooth wave shaping circuit 18.

A color wheel 21 is provided for rotating color filters past the cathode ray tube 13. In the specific example being described, there are three color filters (red, blue and green) on each half of the wheel 21, a total of six filters. Also, there are six metallic teeth 22 on the wheel 21, one for each filter, to form a tone wheel which induces voltage pulses in a pickup coil 23 provided with a permanent magnet to provide the necessary flux.

The color wheel 21 is driven by a capacitor type split-phase motor 26 of conventional design except for the speed control connections. The motor comprises an armature 27 to which the color wheel 21 is coupled through a shaft 28, field windings 29 and 31 which are displaced the usual 90 degrees in space, and a capacitor 32 through which flows the current for the winding 31.

The winding 29 is connected directly across the 60 cycle power line. One end of the winding 31 is connected to one side of the power line through the capacitor 32 while the other end of this winding is connected to the other side of the line through a rectifier such as a diode 33. The last mentioned end of winding 31 in the ordinary split-phase motor connection is connected to the other side of the line through a direct connection rather than through a rectifier.

It will be apparent that with the motor connections thus far described, the current flow through coil 31 would be only momentary and would stop as soon as the capacitor 32 became fully charged. The motor speed is controlled by controlling the amount the capacitor 32 can discharge between positive half cycles of the 60 cycle voltage applied to the plate of the diode 33, thus controlling the amount of current flow through winding 31.

This discharge of capacitor 32 is controlled by a vacuum tube 34 which may be a conventional screen grid tube having a cathode 36, a control grid 37, a screen grid 38 and a plate 39. The tube 34 is connected between the diode end of coil 31 and the diode side of the 60 cycle line in such direction that when the half cycles of the 60 cycle supply are negative at the plate of diode 33, the capacitor 32 may discharge a certain amount through tube 34 depending upon the potential of the control grid 37 with respect to the cathode 36. With this connection, it will be noted, the tube 34 is connected across the diode 33. The screen grid 38 may be connected to the side of the line that is positive during the discharge periods for the capacitor 32, or otherwise provided with a positive operating potential.

The synchronizing control voltage for the grid 37 of tube 34 is obtained as follows:

The pulses produced by the tone wheel in the coil 23 are supplied over a conductor 41 to an amplifier 42 and the amplified pulses are then impressed upon a blocking oscillator 43 of conventional design which produces pulses of large amplitude at the tone wheel frequency. The oscillator 43 is employed merely as a convenient means for converting or amplifying the tone wheel pulses to pulses of the required amplitude.

The blocking oscillator pulses are supplied over a conductor 44 to the discharge tube 46 of a sawtooth wave generator comprising a condenser 47 which receives a charge through a comparatively high resistance resistor 48 and which is discharged suddenly through the tube 46. Thus, there is produced a sawtooth wave as shown in Fig. 2a which is of sufficient amplitude for control purposes.

To the above-described sawtooth wave there is added a second sawtooth wave occurring synchronously with the vertical deflection. This second sawtooth wave, which is illustrated in Fig. 2b, is produced in added relation to the first wave by means of a discharge tube 51 which has its plate-cathode impedance connected across the sawtooth condenser 47 and its control grid connected to the vertical deflecting oscillator 17 for the reception of positive pulses. The control grid of tube 51 may be connected to the grid of a blocking oscillator, for example.

It will be noted that the condenser 47, the resistor 48 and the discharge tubes 46 and 51, in effect, form two sawtooth wave generators which produce the waves of Figs. 2a and 2b in added relation, the added or combined waves appearing across the condenser 47 as shown in Figs. 2c, 2d and 2e.

The amplitude of the combined waves depends upon the phase relation of the two sawtooth waves. This is illustrated in Figs. 2c to 2e where the sawtooth waves produced by the tone wheel and by the vertical deflecting oscillator are combined in the different phase relations indicated by the legends, Fig. 2e representing the condition when the color wheel sawtooth waves are slightly retarded in phase.

The combined waves are applied to a detector tube 52 whereby there appears in its plate circuit a current flow which varies in accordance with the phase relation of said waves. This plate current flow is filtered by a condenser 53 connected across the plate resistor 54 so that, as applied to the grid 37 of the control tube, it is a D. C. control voltage which varies in accordance with any change in the phase relation of the vertical deflection and the color wheel rotation.

As previously explained, an increase in the negative bias on the grid 37 of the control tube will permit less discharge of the motor capacitor 32 and the motor 26 will slow down. Conversely, a decrease in this negative bias will speed up the motor 26.

Considering the circuit operation more in detail, the speed of the motor 26 is first adjusted manually, as by means of a variable tap 56 on the voltage divider 57, so that the color wheel 21 is running in synchronism with the vertical deflection when the two sawtooth waves (Figs. 2a and 2b) have a phase relation such as illustrated in Fig. 2e where the color wheel sawtooth occurs slightly later than the other sawtooth. Then the automatic control action is as follows:

If the motor starts to speed up, the phase relation of the sawtooth waves moves towards that shown in Fig. 2c and the amplitude of the combined wave increases the plate current of tube 52, whereby the plate end of resistor 54 becomes more negative. This increases the negative bias on the grid 37 of the control tube and the motor 26 is slowed down.

Similarly, if the motor starts to slow down, the phase relation of the sawtooth waves moves towards that shown in Fig. 2d whereby the amplitude of the wave applied to the tube 52 decreases, the plate current of tube 52 decreases and the grid of tube 37 is made less negative so that the motor speeds up. It has been found that the color wheel can be held in synchronism in this manner.

In Fig. 4, there is shown an embodiment of the invention in which an additional speed control is combined with a control of the above-described type. The additional control circuit utilizes a tuned circuit 61 to give a comparatively rough control of the motor speed to avoid any difficulty in bringing the motor to synchronous speed at which time the phase shift operated circuit becomes effective.

In Fig. 4, the parts corresponding to those in Figure 1 are indicated by like reference characters.

As shown in Figure 4, the tone wheel pulses are supplied over the conductor 41 and through an amplifier tube 60 to the tuned circuit 61 which is tuned slightly off the frequency at which the tone wheel pulses occur when the color wheel 21 is in synchronism. More specifically, the tone wheel frequency at synchronism is located about half way down on the low frequency side of the resonance curve of the tuned circuit 61, this adjustment being similar to that commonly used in well-known automatic frequency control circuits.

Thus, any change in the motor speed will change the voltage across the tuned circuit 61. This voltage is applied to an amplifier 62 in the phase control circuit and a diode rectifier 63 in the rough speed control circuit.

The rectified output from diode 63 is filtered by the RC combination 66—67 and applied to a D. C. amplifier 68 which causes a current flow through the plate resistor 54 of the tube 52. This current flow has a value depending upon the motor speed. If the motor speeds up, for example, the output of rectifier 63 increases, the grid 37 of the motor speed control tube 34 goes more negative, and the motor 26 is slowed down. A reverse action takes place if the motor starts to run too slow.

The above-described tuned circuit type of speed control circuit is relied upon only to hold the motor close to synchronous speed.

Exact synchronism is maintained by the other portion of the circuit which controls the motor speed in accordance with a phase difference as described in connection with Figure 1. This portion of the circuit comprises a sawtooth wave producing circuit which includes the discharge tube 62 having a plate resistor 70 through which a condenser 71 receives a charge. The positive halves of the sine wave voltage produced across the tuned circuit 61 by the tone wheel pulses discharge the condenser 71 periodically to produce a sawtooth wave.

The discharge tube 62 is held biased beyond cut-off between the positive peaks of the sine wave by grid-leak biasing as is well-known in the art.

Pulses from the vertical deflecting oscillator 17 cause the tube 51 to function as a second discharge tube for the condenser 71 whereby two groups of sawtooth waves add to produce a combined wave having an amplitude dependent upon the phase relation of the two groups of waves as explained in connection with Figure 1.

The said combined voltage wave is applied to a diode rectifier 73 whereby a D. C. control voltage appears across the RC circuit 74—76, this voltage having an amplitude depending upon the above-mentioned phase relation.

The control voltage from rectifier 73 is applied to the D. C. amplifier tube 52 so that the current flow through the plate resistor 54 varies to change the bias on the grid 37 of the motor control tube in accordance with any changes in said phase relation, thus holding the motor at synchronous speed.

Referring more specifically to the circuit operation, if the motor 26 starts to speed up, the phase relation of Figure 2c is approached, the output of rectifier 73 increases, the negative bias on the grid 37 of the motor control tube is increased, and the motor slows down.

In Fig. 5 there is shown a speed control and synchronizing circuit similar to that of Fig. 4, but substantially improved without complicating the circuit. Specifically, the rough speed control portion of the circuit is made substantially independent of line voltage variations by utilizing a balanced circuit design. As will be explained below, the synchronizing control (the speed control responsive to phase shift) is introduced into the circuit in a simplified manner.

In Fig. 5 the parts corresponding to those in the preceding figures are indicated by like reference numerals.

The tone wheel pulses are applied over the conductor 41 to a circuit comprising amplifier tubes 81 and 82 which have their plate circuits connected in balanced relation.

The amplified pulses from tubes 81 and 82 are applied to a pair of tuned circuits 83 and 84 which are connected in balanced relation both to the tubes 81 and 82 and to a pair of diode rectifiers 86 and 87. These tuned circuits are for the same purpose as the tuned circuit 61 of Fig. 4, that is, they are so tuned with respect to the tone wheel frequency at color wheel synchronism that the voltage across them changes with any change in the speed of the color wheel 21.

Specifically, in the example being described, the circuit 83 is tuned to resonate slightly below the tonewheel frequency at synchronism while the circuit 84 is tuned to resonate slightly above said frequency. Thus an increase in the color wheel speed will increase the voltage across the diode 87.

The rectified outputs of the diodes 86 and 87 appear across the load resistors 88 and 89, respectively, which are connected in balanced relation to the diodes. The load resistors are shunted by filtering condensers 91 and 92 and by an output resistor 93 having a variable tap 94.

The output of the balanced circuit is applied from the tap 94 to a direct current amplifier 96 whereby the speed control voltage is impressed upon the grid 37 of the motor control tube 34 as in the embodiment of Fig. 4.

The tap 94 preferably is set at the electrical midpoint of resistor 93 so that when the color wheel is at synchronous speed the voltage at 94 with respect to the cathode of amplifier tube 96 is only the voltage from a voltage divider 97, which voltage appears between the cathode tap 98 and a variable tap 99. The tap 99 is initially adjusted to make the color wheel run approximately at synchronous speed.

From the foregoing it will be apparent that if the color wheel tends to run too fast when power is applied to the receiver, the output of diode 87 will increase, the control grid of tube 96 will go less negative and the grid 37 of motor control tube 34 will go more negative whereby the motor 26 will be slowed down. The opposite action takes place if the motor tends to run too slow.

In order to hold the color wheel in synchronism, rather than merely at a speed close to synchronism, I utilize, just as in Fig. 4, an additional speed control circuit which is responsive to the phase difference of tone wheel pulses and vertical deflection pulses. The design of the phase responsive circuit employed in Fig. 5 is such however, that the number of tubes in the circuit is held to a minimum.

The additional speed control or synchronizing circuit comprises the amplifier tube 51 through which pulses from the vertical deflection oscillator 17 are impressed upon one of the diodes in the balanced circuit. In the specific example illustrated, positive pulses from the oscillator 17 are applied to a buffer tube 51 and, after being reversed in polarity by means of an R-C circuit 101—102, are impressed upon the cathode of the diode 86. The R-C circuit may have the capacity and resistance values indicated on the drawings.

The resulting voltage wave appearing upon the cathode of the diode 86 is shown in Figs. 6a and 6b for two different phase relations of pulses from the vertical deflection oscillator and sine waves produced by the tone wheel in the tuned circuit 83. In Fig. 6a the phase relation is for the case when the color wheel is in synchronism, the pulse falling on one side of the sine wave and with such polarity as to produce a notch therein.

In Fig. 6b there is shown the phase relation resulting from the color wheel starting to speed up. Here the notch occurs near the top of the sine wave whereby the amplitude of the notched wave is reduced. This results in a decrease in the output of the diode 86, since it functions substantially as a peak rectifier, and its plate goes less negative. This makes the tap 94 more positive with respect to the junction point of resistors 88 and 89 (and with respect to the cathode of amplifier 86) whereby the control grid of tube 96 goes more positive (less negative) to increase the negative bias on the grid 37 of the motor control tube 34. Thus the motor is caused to slow down.

From the foregoing it will be apparent that I have provided an improved method and system for holding a motor in synchronism with an incoming synchronizing signal and that I have also provided a simple and effective way of controlling the speed of a split-phase motor.

I claim as my invention:

1. In combination, a motor which is to run in synchronism with a synchronizing signal, means actuated by said motor for producing a control signal in a fixed time relation to the speed thereof, a frequency responsive circuit to which said control signal is applied, circuit means responsive to a change in the phase relation of two applied voltages, means for applying said synchronizing signal and said control signal to said phase responsive circuit means, and means for controlling the speed of said motor in accordance with both said frequency responsive means and said phase responsive means.

2. In combination, a motor which is to run in synchronism with a synchronizing signal, means actuated by said motor for producing a control signal as a function of the speed of said motor, a frequency responsive circuit to which said control signal is applied, circuit means responsive to a change in the phase relation of two applied voltages, means for applying said synchronizing signal and said control signal to said phase responsive circuit means, and means for controlling the speed of said motor in accordance with both said frequency responsive means and said phase responsive means.

3. In a television receiver, a non-synchronous motor for moving color filters successively into position for color picture reproduction, means actuated by said motor for producing a control signal, means for receiving a synchronizing signal, control means for producing a voltage output which changes in value in response to a change in the phase difference of two signals applied thereto, means for applying said control signal and said synchronizing signal to said control means whereby its voltage output varies with any phase difference between said signals, and means for controlling the speed of said motor in accordance with said voltage output.

4. In combination, a motor which is to run in synchronism with a synchronizing signal, means actuated by said motor for producing a control signal in a fixed time relation to the speed thereof, a balanced frequency responsive circuit to which said control signal is applied, said balanced circuit including a rectifier, means for applying said synchronizing signal to said rectifier whereby its output changes in response to either frequency or phase changes of said control signal, and means for controlling the speed of said motor in accordance with the output of said balanced circuit.

5. In a television receiver, a split-phase motor for moving color filters successively into position for color picture reproduction, said motor having two field windings, a capacitor connecting two ends of said windings, a rectifier connecting the other ends of said windings, and a variable impedance device connected across said rectifier, means actuated by said motor for producing a control signal, means for receiving a synchronizing signal, control means for producing a voltage output which changes in value in response to a change in the phase difference of two signals applied thereto, means for applying said control signal and said synchronizing signal to said control means whereby its voltage output varies with any phase difference between said signals, and means for controlling the impedance of said variable impedance device in accordance with said voltage output.

GUSTAVE L. GRUNDMANN.